United States Patent [19]

Presser et al.

[11] 3,869,919
[45] Mar. 11, 1975

[54] METHOD OF DETERMINING THE TEMPERATURE OF A HIGH-TEMPERATURE INSTALLATION AND A TEMPERATURE-INDICATING BODY

[75] Inventors: Karl-Heinz Presser, Julich; Claus-Benedict von der Decken, Kohlscheid, both of Germany

[73] Assignee: Kernforschungsanlage Julich Gesellschaft mit beschrankter Haftung, Julich, Germany

[22] Filed: Dec. 23, 1971

[21] Appl. No.: 211,601

[30] Foreign Application Priority Data
Dec. 24, 1970 Germany............................ 2063754

[52] U.S. Cl................................ 73/358, 116/114.5
[51] Int. Cl. ........................................... G01k 11/08
[58] Field of Search.................... 73/358; 116/114.5

[56] References Cited
UNITED STATES PATENTS
688,562   12/1901   Watkin ................................ 73/358

FOREIGN PATENTS OR APPLICATIONS
3,991   9/1905   Great Britain....................... 73/358

Primary Examiner—Richard C. Queisser
Assistant Examiner—Denis E. Corr
Attorney, Agent, or Firm—Karl F. Ross; Herbert Dubno

[57] ABSTRACT

A method of determining the temperature of a high-temperature installation in the range of, say 230° to 1,800°C wherein shaped nonspherical bodies of elemental or alloyed metal, which are preferably elongated and have a high surface/volume ratio and melting points in the range of interest, are disposed in the heating zone and successively deform under surface tension to form droplets. The bodies, having volumes of about 1 mm$^3$, are contained in a refractory capsule in an inert or reducing environment.

4 Claims, 8 Drawing Figures

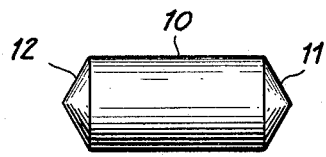
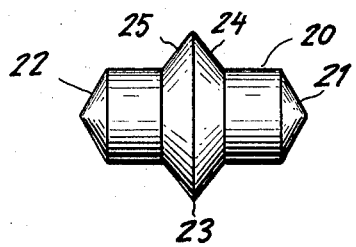
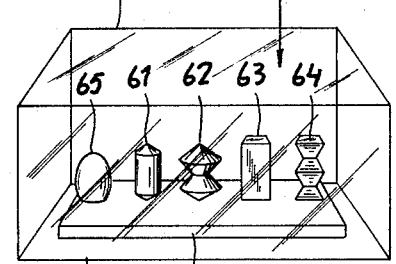
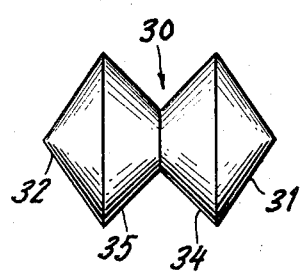
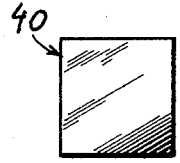
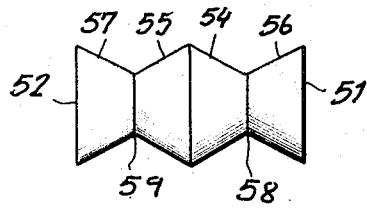
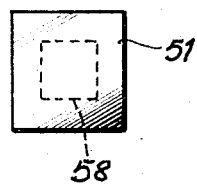

3,869,919

METHOD OF DETERMINING THE TEMPERATURE OF A HIGH-TEMPERATURE INSTALLATION AND A TEMPERATURE-INDICATING BODY

FIELD OF THE INVENTION

Our present invention relates to a temperature-measuring system and to shaped bodies for the measurement of temperatures or the detection of certain maximum temperatures.

BACKGROUND OF THE INVENTION

It has been proposed therefore, especially in ceramic-firing kilns, to provide so-called temperature cones or pyramids (triangles) which are sensitive to temperature and deform upon reaching a well-defined temperature. The bodies are used to indicate that the kiln has reached the temperature represented by the deformed body having the highest deformation temperature, but has not reached the temperature corresponding to the non-deformed body of lowest deformation temperature. The system has been found to be economical and effective but of limited precision and reliability. The requirement for high-temperature-indicating bodies is especially acute in industrial and research chambers which are to be operated at high temperatures, e.g., nuclear-reactor cores.

OBJECTS OF THE INVENTION

It is the principal object of the present invetion to provide temperature-responsive bodies capable of indicating temperatures with a higher degree of accuracy and reliability than has been possible heretofore.

Yet another object of the invention is to provide an improved method of determining the temperature of a high-temperature chamber whereby the disadvantages of earlier systems are obviated.

SUMMARY OF THE INVENTION

We have now discovered that bodies of a pure (elemental) metal or of a metal alloy, especially when having a non-spherical and preferably elongated configuration so that the specific volume is less than the specific volume of a spherical body of the same mass, will have a temperature at which the solid state of the body is transformed into a liquid state in which the high surface tension characteristic of metals controls the shape of the body and transforms the same into a metal droplet. These shaped metal bodies, upon heating to characteristic temperatures, change in shape or configuration under the influence of the surface tension to reduce the surface area/volume ratio to a minimum characterized by the generally spherical configuration of the body. These critical temperatures, which can be experimentally determined without difficulty, are highly characteristic of the body in the sense that the results are fully reproducible and reliable. In other words, once the temperature of a particular metal composition has been established for the change in form under which surface tension becomes controlling, the reproducibility of the event is almost 100 percent. The deformation temperature is usually accurate to a small fraction of a percent.

With pure metals, the form-changing temperature is identical with the melting point and with metal alloys lies at a maximum of 2 percent below the liquidus temperature (in degrees centigrade and is independent of the heating duration and other time factors. The shape change takes place within seconds under the force of the surface tension upon attainment of the characteristic temperature; the shape change is most noticeable when the ratio between surface area and volume is relatively high. In almost all cases, the body becomes more or less spherical or droplet shaped under the effect of surface tension and the change from an elongated or erect body to a sphere can be discerned with the naked eye.

According to an important feature of the present invention, to which we have alluded earlier, the metal composition of characteristic form-changing temperature initially has a shape such that its specific volume is much less than the specific volume of the sphere into which the body can be transformed and having the same mass. The term "specific volume" is here used to define the volume per unit area. Best results have been found with bodies having an actual volume of about 1 mm$^3$ and a ratio of surface area to volume between 5 and 50 mm$^{-1}$. This corresponds to bodies with a surface area of 5 to 50mm$^2$. The shaped bodies according to the present invention are prismatic or rotationally symmetrical, i.e., correspond to a body of revolution about an axis, with the body being mirror-symmetrical with respect to both the median longitudinal plane containing the longitudinal axis and a median transverse plane through the longitudinal axis.

We have found, moreover, that the surface of the shaped body should be metallically clear and free from coatings, deposits and layers, including oxide layers which have a tendency to form naturally on the bodies. Such contamination appears to interfere with the action of surface tension. Thus it is an important part of the invention to provide a capsule or casing for the shaped bodies, of a material which is refractory at least past the maximum temperature to which the assembly may be subjected and which can either be transparent to enable the shaped bodies to be viewed, or can be opened to afford access to the shaped bodies. Within the capsule or casing, the shaped bodies are maintained in a nonoxidizing environment formed by a reducing gas or an inert gas. The capsule or housing may be composed of aluminum oxide, steel or quartz glass.

According to another aspect of the invention, a plurality of shaped bodies of different materials are provided in the capsule with temperature characteristics in the range of interest. The precision of the measurement can be increased by providing one group of shaped bodies for establishing the approximate temperature range while another group of bodies with reduced characteristic temperature range is thereafter used. It is possible in this manner to obtain results which are accurate within ±⅓ percent.

DESCRIPTION OF THE DRAWING

The above and other objects, features and advantages of the present invention will become more readily apparent from the following description, reference being made to the accompanying drawing in which:

FIG. 1 is an elevational view of a shaped body according to the present invention having the configuration of a body of revolution;

FIG. 2 is an elevational view of another shaped body with increased surface area/volume ratio;

FIG. 3 is an elevational view of a body of revolution according to another feature of the invention;

FIG. 4 is an elevational view of a prismatic body;
FIG. 5 is an elevational view of another prismatic body embodying the invention but having greater surface area/volume ratio;
FIG. 6 is an end view of the body of FIG. 4;
FIG. 7 is an end view of the body of FIG. 5; and
FIG. 8 is a perspective view of a capsule according to the present invention.

SPECIFIC DESCRIPTION

In FIG. 1 of the drawing, we have shown a body according to the invention which may be be composed of a metal or metal alloy having a characteristic shape-changing temperature at which the body configuration transforms into a sphere or droplet shape. The body has a cylindrical central portion 10 and a pair of end portions 11 and 12 which are of conical configuration.

In FIG. 2, the area/volume ratio has been changed by providing on the central cylindrical body 20, an outwardly extending bead 23 with conical flanks 24 and 25. The conical ends 21 and 22 are, however, provided as described earlier.

The nonspherical body of FIG. 3 has nonconical end portions 31 and 32 flanking a central portion 30 made up of axiallly outwardly divergent frustocones 34 and 35.

In FIGS. 1–3, the conical ends may be used to position the shaped bodies in respective seats of a support, if desired. The longitudinal mirror-symmetry plane is represented at LP and the transverse median plane at TP.

From FIGS. 4 and 6, it will be apparent that the present invention also may make use of prismatic configurations such as the rectangular parallelepiped illustrated in these Figures. A variation of the prismatic configuration is represented in FIGS. 5 and 7 in which bases 51 and 52 are shown to have square configurations. From the bases, pyramidally converging flanks 56 and 57 converge inwardly to define small bases 58 and 59 at approximately one quarter of the distance in from each extremity of the body. The central portion of the body is formed by pyramidally outwardly convergent surfaces 54 and 56.

In FIG. 8, we have shown a capsule 60 composed of alumina or quartz glass and transparent to allow observation of a number of shaped bodies 61, 62, 63 and 64 as described with respect to FIGS. 1–5, one of which has melted and, under the action of surface tension, been converted to a ball 65. The bodies are fixed to base 66 and the interior of the capsule is filled with an inert gas such as argon or neon. The system illustrated in FIG. 8 shows that the temperature associated with the left-hand body 65 has been reached but was below the characteristic temperature of body 61. For convenience, a different body shape may be provided for each temperature.

SPECIFIC EXAMPLE

The temperature in a reactor chamber to be operated at about 1,077°C is to be monitored using a system as shown in FIG. 8. Each of the shaped bodies has a volume of 1 mm$^3$ and a configuration designed to provide a ratio of surface area to volume of about 6.4 mm$^2$. For example, the rectangular parallelepiped has a square base dimensional of 0.8 × 0.8 mm and a length of 1.6 mm. Six bodies are provided in all, with the following characteristic temperatures and compositions:

| Metal or Metal alloy | Composition in weight percent | Shape-change temperature (°C) |
| --- | --- | --- |
| Ag/Au | 32/68 | 1034 – 1036 |
| Ag/Au | 18/82 | 1050 |
| Au | 100 | 1063 |
| Pt/Sn | 71/29 | 1070 |
| Cu | 100 | 1083 |
| Cu/Pd | 77/23 | 1090 – 1112 |

In use, the first four bodies are found to have become droplets while the last three remain intact, thereby showing that the maximum temperature reached was above 1,070°C, but below 1,083°C. Accuracy was within one percent and reproducibility was 100%. The bodies were received in a quartz glass capsule under a mixture of argon, mitrogen and hydrogen and carbon monoxide in nickel parts by volume.

It should be noted that every metal has a characteristic volume for a given mass, under the influence of surface tension and gravity, upon melting.

In addition, the process may be carried out in several tests with individually shaped bodies or in a single test with a plurality of bodies. To check reliability, it is preferred to carry out the measurement with a number of shaped bodies in a succession of tests.

We claim:
1. In a system for measuring the temperature of a high-temperature chamber, the improvement which comprises a capsule composed of a refractory material, and a plurality of elongated metallic bodies of a volume of about 1mm$^3$ in said capsule, each of said bodies having a characteristic shape-changing temperature different from that of others of said bodies and in which the shape alters under the action of surface tension, each of said bodies having a surface area to volume ratio between 5 and 50mm$^{-1}$ and greater than that of a sphere of corresponding mass, each said body having an axis and being mirror-symmetrical with respect to a median plane through said axis and with respect to a median plane perpendicular to said axis, said bodies being received in said capsule in a nonoxidizing atmosphere.

2. The improvement defined in claim 1 wherein said capsule is composed of a substance selected from the group which consists of aluminum oxide, quartz and steel.

3. The improvement defined in claim 2 wherein said nonoxidizing atmosphere is selected from the group which consists of inert gas reducing gas and mixtures thereof.

4. A method of measuring the temperature of a high-temperature region, comprising the steps of:
   a. incorporating in a common capsule under a nonoxidizing gas a plurality of bodies having different characteristic shape changing temperatures, each of said bodies having a surface area to volume ratio between 5 and 50mm$^{-1}$ and a volume of about 1mm$^3$, said bodies having symmetrical shapes altering under the action of surface tension at the respective shape changing temperature;
   b. introducing said capsule into said high-temperature region; and
   c. visually detecting successive transformations of said bodies into droplets under the action of surface tension.

* * * * *